United States Patent Office 3,793,389
Patented Feb. 19, 1974

3,793,389
QUENCHING PROCESS FOR PYROLYTICALLY CRACKED HYDROCARBONS

Thaddeus J. Oleszko, Burghausen, Germany, and Lynn P. Walker, Robinson, Ill., assignors to Marathon Oil Company, Findlay, Ohio
Continuation-in-part of application Ser. No. 16,443, Mar. 4, 1970, now Patent No. 3,674,890. This application June 14, 1972, Ser. No. 262,818
The portion of the term of the patent subsequent to July 4, 1989, has been disclaimed
Int. Cl. C07c 3/00; C10g 9/12
U.S. Cl. 260—679 R                                19 Claims

ABSTRACT OF THE DISCLOSURE

Improved quenching of pyrolytically cracked gas is effected by separating the hydrocarbon-water emulsion produced in a quenching zone of a plurality of multistage quenching process and then transferring the emulsion to the initial stage of the quenching zone wherein incoming gases vaporize the water from the emulsion. Also, a slurry containing particulate carbon, e.g. produced by scrubbing exhaust gases from a Wulff process, can be transferred to the initial stage of the quenching zone to recover hydrocarbon and particulate carbon.

CROSS REFERENCE TO RELATED APPLICATION

Figure 1:
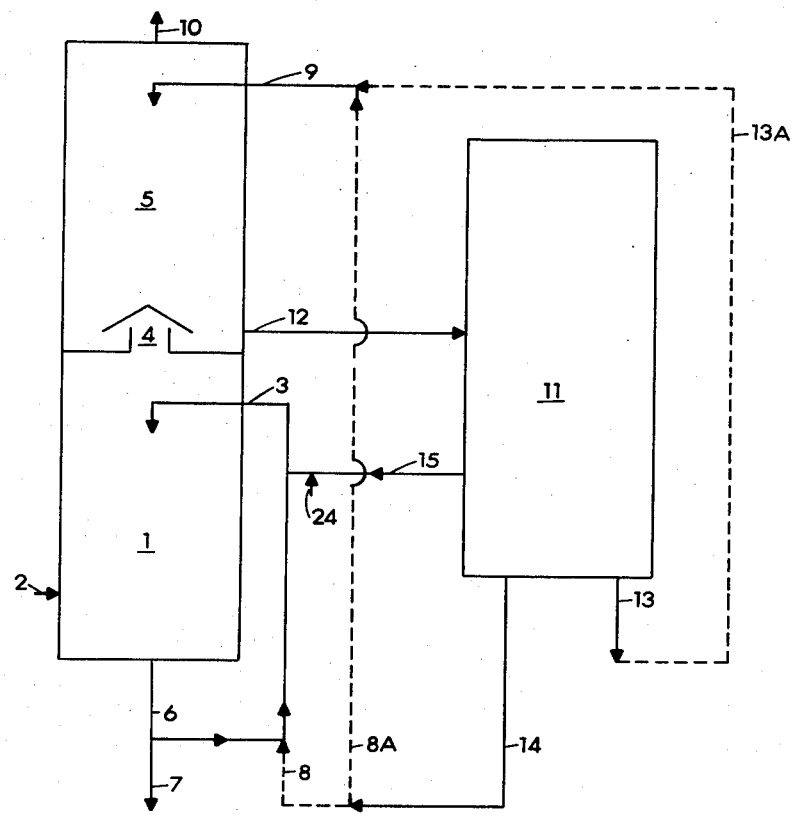

This is a continuation-in-part of our copending patent application, Ser. No. 16,443, filed Mar. 4, 1970, now U.S. Pat. No. 3,674,890.

BACKGROUND OF THE INVENTION

Field of the invention

This invention relates to thermal cracking of a hydrocarbon, more specifically to the quenching operation, and most specifically to the disposition of the hydrocarbon-water emulsion and particulate carbon recovered in the quenching operation.

Prior art

In the process of thermal cracking a hydrocarbon for the production of acetylene, ethylene, butadiene and other olefins, such as the Wulff process, finely divided carbon or soot particles are produced in the product gas. After the hydrocarbon has been cracked, the product gas is rapidly cooled or quenched to stop further reaction. The quenching operation is accomplished by contacting the hot product gas with a quenching liquid such as a hydrocarbon, e.g., oil, or water. An emulsion or slurry-emulsion is produced in the quenching operation. The slurry-emulsion consists of a hydrocarbon-water emulsion containing particles of finely divided carbon or soot. The emulsion or slurry-emulsion must be treated so as to recover the valuable materials therein to increase process efficiency and to avoid pollution problems.

In addition, the Wulff process is a regeneration process wherein a material such as ceramic tile is first heated by combustion gases and subsequently the heated tile is used to heat the hydrocarbon feed gas so as to produce a cracked gas product. The combustion gases produced in the heating portion of the regeneration cycle contain hydrocarbons and particulate carbon. To avoid air pollution problems and the fouling of equipment, the particulate carbon and hydrocarbons are scrubbed from the exhaust gases producing a slurry of scrubbing liquid, particulate carbon and hydrocarbons. The slurry must be treated so as to recover the valuable materials therein.

In addition, the Wulff process is a regeneration process wherein a material such as ceramic tile is first heated by combustion gases and subsequently the heated tile is used to heat the hydrocarbon feed gas so as to produce a cracked gas product. The combustion gases produced in the heating portion of the regeneration cycle contain hydrocarbons and particulate carbon. To avoid air pollution problems and the fouling of equipment, the particulate carbon and hydrocarbons are scrubbed from the exhaust gases producing a slurry of scrubbing liquid, particulate carbon and hydrocarbons. The slurry must be treated so as to recover the valuable materials therein. U.S. Pats. 2,394,849, 2,945,075, 2,982,794, and 3,236,905 all teach various quenching processes including hydrocarbon and water separation zones. None of the above patents teach the recycling of a hydrocarbon-water emulsion to the first stage of a quenching zone.

The object of this invention is to provide an economical process for treating hydrocarbon-water emulsions and/or slurries containing particulate carbon which are produced in the pyrolytic hydrocarbon cracking process. Thereby, efficiency of operation and pollution control are increased.

SUMMARY OF THE INVENTION

The present invention is a process for the treatment of hydrocarbon-water emulsions, particulate carbon-water slurries and particulate carbon-hydrocarbon slurries produced in a pyrolytic process for producing alkenes and alkynes. The process requires very little equipment and is economically feasible. It may be utilized with any pyrolytic process for the production of alkenes and alkynes.

BRIEF DISCRIPTION OF THE DRAWINGS

Figure 2:
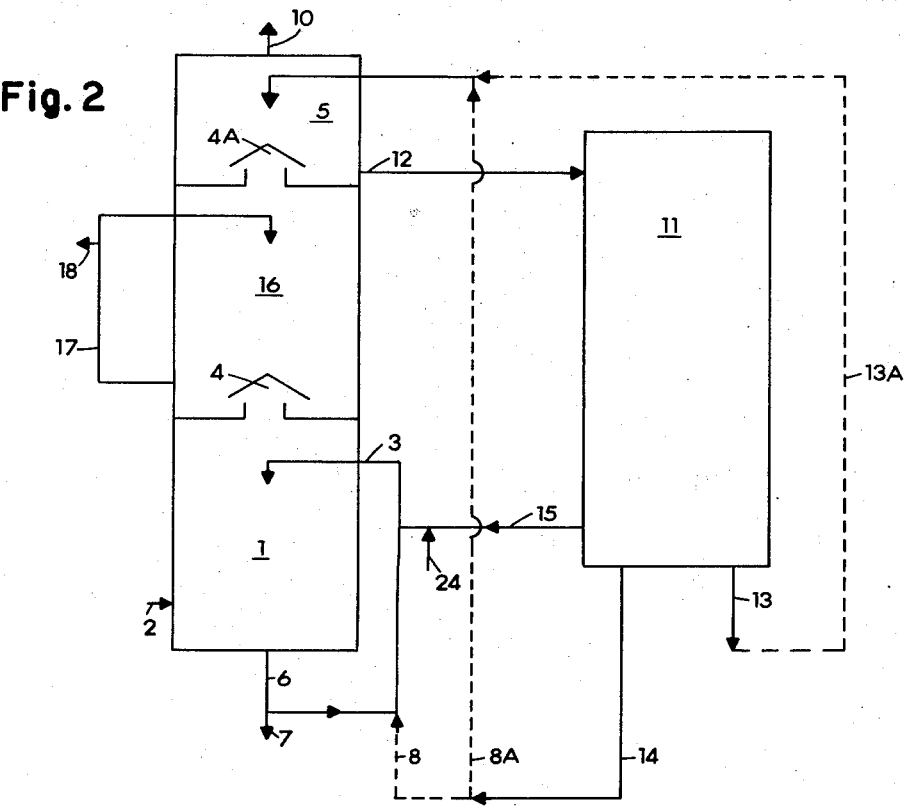
Figure 3:
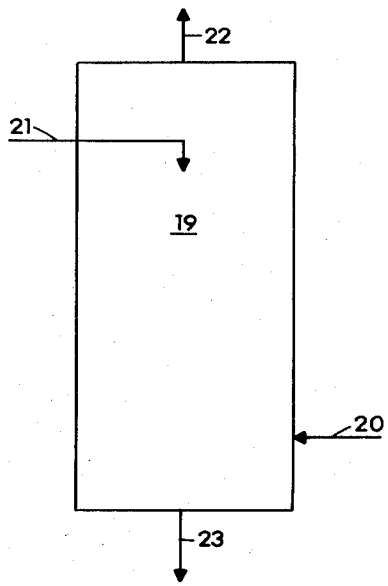

FIG. 1 is a schematic process flow diagram for a two-stage quench process.
FIG. 2 is a schematic process flow diagram for a three-stage quench process.
FIG. 3 is a schematic process flow diagram for a scrubbing process for the exhaust gases produced in a regenerative pyrolytic hydrocarbon cracking process.

DESCRIPTION OF THE PREFERRED EMBODIMENTS

The invention and its advantages may be more easily understood by reference to the drawings. FIG. 1 shows a two-stage quench tower, which is the simplest embodiment of the present invention. In FIG. 1, high temperature cracked gas is introduced into the first stage of the quench tower 1 via line 2. Quenching oil is introduced into the first stage of the quench tower 1 via line 3. The cracked gas and the quenching oil is contacted in the first stage of the quench tower in countercurrent flow with the cracked gas passing through the stage separation device 4 into the final stage of the quench tower 5. Quenching oil remaining in the first stage of the quench tower 1 is withdrawn from the first stage via line 6. A portion of said withdrawn quenching oil is removed from the quench system via line 7. The remainder of said withdrawn quenching oil is recycled to the first stage of the quench tower 1 via line 3.

A final quenching liquid is introduced into the final stage of the quench tower 5 via line 9. The cracked gas and the final quenching liquid is contacted in countercurrent flow in the final stage of the quench tower 5 with the cracked gas passing from the quench tower to subsequent treatment via line 10. The liquid remaining in the final stage of the quench tower after the final quench liquid is contacted with the cracked gas is transferred from the final stage of the quench tower 5 to the separation zone 11 via line 12.

The liquid withdrawn from the final stage of the quench tower 5 ordinarily contains at least three phases, i.e.

water, hydrocarbon (this term is meant to include oil) and an emulsion of the water and the hydrocarbon. The purpose of the separation zone 11 is to phase separate the liquid into three separate phases. The water phase is withdrawn from separation zone via line 13. The hydrocarbon phase is withdrawn from the separation zone via line 14. A portion of the separated hydrocarbon phase may be added, via dotted line 8, to that portion of the quench oil which is recycled in the first stage of quench tower 1. The separated hydrocarbon-water emulsion is transferred from separation zone 11 to quench oil 3 via line 15.

The ordinary pyrolytic or thermal cracking process for cracking hydrocarbons to produce alkenes and alkynes also produce a substantial quantity of particulate carbon in the cracked gas product. Therefore, the cracked gas product entering the quenching process will ordinarily contain about 0.001 to about 0.10 pound of particulate carbon per pound of dry gas. In FIG. 1, the particulate carbon would be entering with the cracked gas via line 2. One of the purposes of the quenching process is to remove the particulate carbon from the cracked gas. Therefore, the quench oil leaving the first stage of the quench tower 1 via line 6 will ordinarily contain a substantial quantity of particulate carbon. A portion of the particulate carbon is removed from the quenching process entrained in that portion of said quench oil removed via line 7.

A portion of the particulate carbon may be carried by the cracked gas passing from the first stage of the quench tower 1 to the final stage of the quench tower 5. Therefore, particulate carbon is ordinarily entrained in the liquid transferred from the final stage of the quench tower to the separation zone. Consequently, the three liquid phases, which are separated in the separation zone 11, ordinarily contain particulate carbon. The particulate carbon collects preferentially in the emulsion phase of the liquid separated in the separation zone. One of the purposes of the present invention is to teach a process for the transfer of particulate carbon entrained in the hydrocarbon-water emulsion formed in the final stage of the quenching process to the quench oil of the first stage of the quenching process. The amount of particulate carbon entrained in the emulsion is about 0.0001 to 0.10 pound of carbon per pound of emulsion.

The preferred pressure within the quench tower or quenching zone is about 0.1 to about 10 atmospheres; the more preferred pressure is about 0.25 to about 5.0 atmospheres; and the most preferred pressure is about 0.4 to about 3 atmospheres.

The preferred temperature of the cracked gas entering the quenching process is about 100° C. to about 800° C.; the more preferred temperature is about 250° C. to about 600° C.; and the most preferred temperature is about 350° C. to about 450° C.

The preferred temperature of the cracked gas passing from the first stage of the quenching zone 1 to the final stage of the quenching zone 5 is about 15° C. to about 500° C.; the more preferred temperature is about 50° C. to about 300° C.; and the most preferred temperature is about 70° C. to about 170° C.

The preferred pressure within the separation zone above the liquid is about 0.1 to about 10 atmospheres; the more preferred pressure is about 0.25 to about 5.0 atmospheres; and the most preferred pressure is about 0.4 to about 3 atmospheres. The preferred temperature of the separation zone is about 10° C. to about 150° C.; the more preferred temperature is about 25° C. to about 100° C.; and the most preferred temperature is about 50° C. to about 90° C.

The quench oil utilized in the first stage of the quench zone is any hydrocarbon of which at least a portion is liquid at the operating temperatures and pressures of the quenching process. The quench oil may be a mixture of hydrocarbons, a portion of which may be a vapor at the operating temperatures and pressures. However, at least a portion of the quench oil is liquid at the operating temperatures and pressures so that polymeric organic compounds and particulate carbon are entrained in the quench oil and removed from the first stage of the quench zone via line 6.

The final quenching liquid utilized in the final stage of the quench zone 5 may be water, hydrocarbon or a mixture of hydrocarbon and water. The preferred temperature of the final quench liquid in line 9 is about 5° C. to about 130° C.; the more preferred temperature is about 20° C. to about 80° C.; and the most preferred temperature is about 25° C. to about 50° C.

The preferred temperature of the cracked gas leaving the final stage of the quench zone 5 via line 10 is about 15° C. to about 150° C.; the more preferred temperature is about 20° C. to about 100° C.; and the most preferred temperature is about 30° C. to about 75° C.

If water is to be used as the final quench liquid, a portion of the water withdrawn from the separation zone via line 13 may be recycled to the final stage of the quench zone 5 by interconnecting line 13 and line 9. This is illustrated by dotted line 13A in FIG. 1. If necessary, the recycled water may be cooled in a cooling zone prior to introduction into the final stage of the quench zone 5 via dotted line 13A and line 7.

If a hydrocarbon is to be used as the final quench liquid in the final stage of the quench zone 5, a portion of the hydrocarbon phase removed from the separation zone via line 14 may be recycled to the final stage of the quench zone. This is shown by dotted line 8A interconnecting line 14 and line 9 in FIG. 1. If necessary, a portion of the separated hydrocarbon which is recycled to the final stage of the quench zone 5 may be cooled prior to introduction of the final stage via line 9.

The quench oil which is recycled in the first stage quench zone 1 may be cooled in a cooling zone prior to introduction into the first stage of the quench zone via line 3.

The operating temperatures and pressures of the process are not critical. However, the temperature of the cracked gas within the first stage of the quench zone 1 must be maintained above the dew point for water. The dew point is a function of the concentration of water, the temperature of the cracked gas and the pressure within the quenching zone. It is detrimental to the process of this invention if water condenses and is entrained in the oil in contact with the cracked gas in the first stage of the quenching zone 1.

The equipment utilized to effect contact between the gaseous phase and the liquid phase in the quench stage of the quenching zone is not critical. Examples of equipment which may be used for this purpose are: bubble-cap trays, perforated plates, packed column, etc. The stage separation devices 4 and 4A may be any device which provides for the collection of a liquid and the passage of gas. An example of such a device is the bubble-cap tray.

FIG. 2 illustrates the process of the present invention having a three-stage quenching zone. In FIGS. 1 and 2, like numbers denominate like parts of the process as illustrated by the figures.

The distinction between the process shown in FIG. 2 and the process shown in FIG. 1 is that FIG. 2 has an intermediate quenching stage 16 within the quenching zone. An intermediate quench oil is introduced via line 17 into the intermediate quenching stage 16. The intermediate quench oil is contacted with the cracked gas in countercurrent flow. Cracked gas passes from the first stage of the quenching zone 1 through the stage separation device 4 into the intermediate stage of the quenching zone 16 and thence from the intermediate stage of the quenching zone 16 through stage separation device 4A to the final stage of the quenching zone 5. The final stage of the quenching zone 5 shown in FIG. 2 is operated in the same manner as the final stage of the quenching zone shown in FIG. 1.

Intermediate quench oil is collected on stage separation device 4 and is withdrawn via line 17 and is recycled to the intermediate stage of the quenching zone 16. In the process, aromatic organic compounds produced in the cracking process tend to condense and collect in the intermediate stage of the quenching zone 16. The intermediate quench oil is ordinarily enriched in aromatic compounds. The volume of the intermediate quench oil is ordinarily increased. Therefore, a portion of the intermediate quench oil is removed from the quench process via line 18.

The preferred temperature of the cracked gas entering the quenching zone 16 is about 15° C. to about 500° C.; the more preferred temperature is about 50° C. to about 300° C.; and the most preferred temperature is about 70° C. to about 170° C. If necessary, the recycled intermediate quench oil may be cooled prior to introduction into the intermediate stage of the quench zone 16. Although the temperatures within the process having a three-stage quench zone are generally not critical, the intermediate stage of the quenching zone 16 and the first stage of the quenching zone 1 in FIG. 2, like the first stage of the quenching zone 1 in FIG. 1, must be maintained above the dew point for water. The dew point for water is a function of the pressure and temperature within the process and the concentration of water in the cracked gas. The temperature of the cracked gas leaving the intermediate stage must be maintained above the dew point for water.

The flow rates of the fluids within the process are interdependent upon the composition of the fluids, the physical properties of the fluids, and the desired operating conditions. The flow rates are not critical to the present invention except that water must not be allowed to condense in the quench oil in the first stage of the two-stage quenching process or in an intermediate stage of a quenching process having more than two stages.

The process utilized in the separation zone 11 of the quenching process is not critical. Examples of satisfactory processes are centrifugation and a gravity settling.

The conditions enumerated in the description of FIG. 1 also apply to like numbered parts of FIG. 2.

FIG. 3 illustrates the process wherein the exhaust gases produced in the heating phase of the regenerative pyrolytic cracking process, i.e., the Wulff process, are scrubbed to remove hydrocarbons and particulate carbon. In FIG. 3, the exhaust gases produced in the heating phase of the regeneration cycle are introduced into the scrubbing zone 19 via line 20. Scrubbing liquid is introduced into the scrubbing zone via line 21. Said scrubbing liquid may be either a hydrocarbon, water or a mixture of hydrocarbon and water. Scrubbed exhaust gas is withdrawn from the scrubbing zone via line 22. Scrubbing liquid is contacted with the exhaust gases in countercurrent flow. Scrubbing liquid containing hydrocarbons and particulate carbon produced in the heating phase of the regeneration cycle are collected and are removed from the scrubbing zone via line 23. Said scrubbing liquid containing hydrocarbons and particulate carbon is transferred from the scrubbing zone to the first stage of the quench zone via line 23, shown in FIG. 3, and via line 24 and line 15, as shown in FIGS. 1 and 2.

A preferred embodiment of this invention is to combine the emulsion stream 15 with quench oil stream 3 and thereafter inject the combination into the first stage quench zone. Examples of such streams include quench oil containing about 0.02 to about 20% or more, and preferably about 0.05 to about 5% of the emulsion. Concentration of the emulsion within the quench oil can be increased if desired. The quench oil can contain makeup oil, e.g. condensation products from cracked gases, for example from a Wulff furnace, as well as quench oil cascading down from the second stage quench. Other types of hydrocarbon are useful as make-up for the quench oil.

In a four-stage quench system, the first stage quench be effected with the combination of the quench oil plus emulsion. The second stage quench uses quench oil cascading preferably from the third stage quench; however, the quench oil can be composed of make-up quench oil or hydrocarbon. The third stage quench can be quench oil, preferably "virgin" or make-up oil or hydrocarbon, e.g. obtained from outside of the unit. The fourth stage quench can be effected preferably using water as the quench liquid. The above quench liquids are preferred embodiments of this invention and should not limit the interpretation of the claims. Of course, gases condensing within the quenching sequence are incorporated within the different quench liquids.

An example of emulsion composition can contain about 0.001 to about 2% or more of soot or by-products of combustion or cracking of hydrocarbons. Typical oil or hydrocarbon concentrations of the emulsions can range from about 5% to about 98%. The water concentration can be about 2% to about 95%. These emulsions, depending upon the property of the soot, can be very stable emulsions and very difficult to separate into their respective water and hydrocarbon phases. The quantity of the emulsion that can be incorporated into the quench oil is dependent, among other things, upon how much heat is available within the first stage quench, etc.

The operating temperature and pressure of the exhaust gas scrubbing zone are not critical. However, the scrubbing zone must be operated such that at least a portion of the scrubbing liquid remains as a liquid after contacting the exhaust gas. The flow rates, temperatures and pressures utilized in the scrubbing zone are a function of the engineering design and are not critical to the present invention.

As shown in FIGS. 1 and 2, the process of the present invention treats the hydrocarbon-water emulsion produced in the final or subsequent stage of the quench zone by first separating the hydrocarbon-water emulsion from the water phase and the hydrocarbon phase and then transferring the hydrocarbon-water emulsion to the first stage of the quench zone. The heat available in the cracked gas which enters the quenching process is utilized to vaporize substantially all of the water from the emulsion. In this manner, the water is separated from the emulsion leaving substantially hydrocarbon.

If the hydrocarbon-water emulsion contains particulate carbon, the particulate carbon remains with the hydrocarbon in the first stage of the quench zone. Thus, the hydrocarbon and particulate carbon is separated from water.

Finally, the scrubbing liquid produced in an exhaust scrubbing process in a regenerative cracking process containing hydrocarbons and particulate carbon can be treated in the first stage of the quench zone. If the scrubbing liquid introduced into the scrubbing tower is water, the water is separated from the hydrocarbons and particulate carbon. If the scrubbing liquid is a hydrocarbon, the hydrocarbon may be fractionated thereby concentrating the particulate carbon. The "spent" scrubbing liquid or a portion thereof is introduced into the first stage quench zone via line 24.

It is understood that the embodiments illustrated in the drawings do not limit this invention. The drawings merely illustrate the process of the present invention. Obvious modifications will be apparent to one skilled in the art upon reading the present invention. An example of such modifications is: the cocurrent contacting of the separation zone following each stage of the quenching process. Such modifications are to be included within the spirit of the claims appended thereto.

Specific embodiments of the invention are illustrated in the following example.

EXAMPLE

Five pounds of naphtha and ten pounds of steam are reacted per minute in a Wulff-type furnace producing a product having approximately 85 percent by dry weight of organic compounds having five or less carbon atoms, approximately ten percent by dry weight of organic compounds having between six and twenty carbon atoms and having five percent by dry weight of coke or particulate carbon based upon the weight of hydrocarbon feed. The cracked gas product containing the particulate carbon and the higher molecular weight organic compounds is introduced into the first stage of a quench tower at a temperature of about 430° C. The cracked gas product is contacted in countercurrent flow with quench oil having an initial temperature of about 95° C. The temperature of the quench oil is increased to about 160° C. after contacting the cracked gas product. The pressure of the quenching zone is about 0.5 atmosphere. The quench oil is subsequently removed from the first stage of the quench tower, with a portion of the quench oil being recycled through a cooling zone wherein the temperature of the quench oil is reduced from about 160° C. to about 95° C. The cracked gas product is passed from the first stage of the quench tower to the intermediate stage of the quench tower. The temperature of the cracked gas passing from said first stage to the intermediate stage is about 150° C. The cracked gas product is contacted in the intermediate stage of the quench tower with a second quench oil in countercurrent flow. The initial temperature of the second quench oil or intermediate quench oil is about 80° C. The temperature of the intermediate quench oil is increased to about 140° C. while contacting the cracked gas product. The cracked gas product is then passed from the intermediate stage of the quench tower to the final stage of the quench tower wherein the cracked gas product is contacted with water in countercurrent flow. The temperature of the cracked gas product passing from the intermediate stage to the final stage of the quench tower is approximately 80° C. The initial temperature of the quench water entering the final stage of the quench tower is approximately 30° C. The temperature of the quench water is increased to about 75° C. while contacting the cracked gas product. The cracked gas product is withdrawn from the final stage of the quench tower at a temperature of approximately 40° C. A liquid is collected at the bottom of the final stage of the quench tower having a mixture of a water phase, hydrocarbon phase, hydrocarbon-water emulsion phase and with particulate carbon entrained in the emulsion phase. The hydrocarbon-water emulsion phase is separated from the water phase and the hydrocarbon phase and is introduced into the first stage of the quench tower along with the quench oil at a temperature of about 75° C. An oil phase is separated from the three phase mixture and a portion of the oil phase is utilized as make-up quench oil in the first stage. A portion of the water phase is cooled and utilized as quench water in the final stage of the quench tower. A portion of the quench oil removed from the first stage of the quench tower after contacting the cracked gas product is removed from the quenching process. Particulate carbon is thereby removed from the quenching process.

What is claimed is:

1. An improved process for quenching cracked gas at a temperature of about 100° C. to about 800° C. comprising in combination cleaning and cooling the cracked gas in a quenching zone having a plurality of stages by first contacting the cracked gas with a quench oil in a first stage, then contacting said cracked gas with a quenching liquid in a stage subsequent to said first stage, and producing a liquid containing hydrocarbon, water, and a hydrocarbon-water emulsion in said subsequent stage; the improvement comprising withdrawing said liquid containing hydrocarbon, water, and hydrocarbon-water emulsion from said subsequent stage; transferring said liquid to a separation zone wherein said liquid is separated into a hydrocarbon phase, water phase, and a hydrocarbon-water emulsion phase; transferring at least a portion of the hydrocarbon-water emulsion phase to the quench oil to be injected into the first stage and introducing a stream containing the combination of the quench oil and the emulsion into the first stage at a temperature sufficient to substantially vaporize the water in the emulsion; and maintaining the temperature, pressure, and water concentration within the first stage quench zone such that substantially no water vapor condenses in the first stage.

2. The process of claim 1 wherein the pyrolytically cracked gas contains about 0.001 to about 0.10 pound of particulate carbon per pound of dry gas.

3. The process of claim 1 wherein the cracked gas contains alkenes and alkynes having two or more carbon atoms.

4. The process of claim 1 wherein the pressure within the quenching zone is about 0.1 to about 10 atmospheres at the surface of the liquid.

5. The process of claim 2 wherein the hydrocarbon-water emulsion contains about 0.0001 to about 0.2 pound of particulate carbon per pound of emulsion.

6. The process of claim 1 wherein the cracked gas and the stream containing the combination of the quench oil and the emulsion are contacted in countercurrent flow.

7. The process of claim 1 wherein at least a portion of the quench oil remains in a liquid phase in the first stage of the quenching zone.

8. The process of claim 7 wherein said remaining liquid quench oil is separated from the cracked gas after the quench oil contacts the cracked gas.

9. The process of claim 1 wherein the temperature of the cracked gas passing from the first stage of the quenching zone to the stage subsequent to the first stage is about 15° C. to about 500° C.

10. The process of claim 1 wherein the temperature within the separation zone is about 10° C. to about 150° C.

11. The process of claim 1 wherein the pressure within the separation zone is about 0.1 to about 10 atmospheres at the surface of the liquid.

12. The process of claim 1 wherein a portion of the hydrocarbon phase separated in the separation zone is incorporated into the stream containing the quench oil and the emulsion.

13. The process of claim 1 wherein a portion of the water phase separated in the separation zone is transferred to said subsequent stage and is contacted with the cracked gas.

14. An improved process of quenching gases from a regenerative pyrolytic hydrocarbon process wherein exhaust gases produced in the generation step of the regeneration process contain particulate carbon and the gases are scrubbed with a scrubbing liquid to remove the particulate carbon and wherein a slurry of particulate carbon and scrubbing liquid comprised of a hydrocarbon-water emulsion is produced and the pyrolytically cracked gas is quenched in a plurality of stages, the first stage of which comprises contacting the cracked gas with a quench oil; the improvement comprising incorporating the slurry of particulate carbon and the emulsion into the quench oil and then using this stream to quench the cracked gas in the first stage.

15. The process of claim 14 wherein substantially all of the water within the emulsion is vaporized in the first stage of the quenching process.

16. The process of claim 14 wherein the scrubbing liquid is comprised of a hydrocarbon.

17. An improved process for quenching pyrolytically cracked gas containing alkenes and alkynes having two or more carbon atoms wherein the cracked gas is cleaned and cooled in a four stage quenching zone wherein the cracked gases are contacted in a first stage quench zone with quench oil, then contacted in a second stage quench zone with quench oil cascading from a third stage quench zone, thereafter the gases are contacted in the third stage quenching zone with a quench liquid comprised of a hydrocarbon, and finally the cracked gases are contacted in a fourth stage quench zone with water to obtain the cleaned and cooled cracked gases, and wherein the spent quench oil from the second stage quench zone contains hydrocarbon, water and a hydrocarbon-water emulsion; the improvement comprising separating the emulsion from the spent second-stage quench liquid and incorporating at least a portion of the emulsion into the first stage quench oil and introducing the combination of the first stage quench oil and emulsion into the first stage quench zone to quench the cracked gases.

18. The process of claim 17 wherein the cracked gas entering the first stage quenching zone contains particulate carbon.

19. The process of claim 17 wherein the temperature, pressure and water concentration are maintained within the first stage quench zone such that no water vapor condenses in the first stage quench zone.

References Cited

UNITED STATES PATENTS

| | | | |
|---|---|---|---|
| 3,674,890 | 7/1972 | Oleszko et al. | 260—683 |
| 2,945,075 | 7/1960 | Scofield | 260—679 |
| 2,928,886 | 3/1960 | Nisbet et al. | 260—683 |
| 3,342,724 | 9/1967 | Goering | 208—101 |
| 2,236,534 | 4/1941 | Hasche | 260—679 |
| 1,880,309 | 4/1928 | Wulff | 260—679 |
| 1,938,991 | 12/1933 | Wulff | 260—679 |

DELBERT E. GANTZ, Primary Examiner

J. M. NELSON, Assistant Examiner

U.S. Cl. X.R.

23—276; 55—63; 208—48; 260—683; 423—461